United States Patent [19]

Matsufuji et al.

[11] Patent Number: 4,499,478

[45] Date of Patent: Feb. 12, 1985

[54] INK JET RECORDING APPARATUS

[75] Inventors: Yohji Matsufuji; Shigeo Togano; Hiroo Ichihashi, all of Tokyo, Japan

[73] Assignee: Canon Kabushiki Kaisha, Tokyo, Japan

[21] Appl. No.: 334,909

[22] Filed: Dec. 28, 1981

[30] Foreign Application Priority Data

| | | | |
|---|---|---|---|
| Jan. 16, 1981 | [JP] | Japan | 56-5517 |
| Jan. 16, 1981 | [JP] | Japan | 56-5518 |
| Jan. 16, 1981 | [JP] | Japan | 56-5519 |
| Jan. 16, 1981 | [JP] | Japan | 56-5520 |

[51] Int. Cl.$^3$ ...................... G01D 15/16; G01D 15/18

[52] U.S. Cl. ................................................ 346/140 R

[58] Field of Search .............. 346/75, 140 PD, 140 IJ; 361/417

[56] References Cited

U.S. PATENT DOCUMENTS

| | | | |
|---|---|---|---|
| 3,501,615 | 3/1970 | Merryman et al. | 346/76 PH X |
| 4,243,994 | 1/1981 | Kobayashi et al. | 346/140 R |
| 4,313,684 | 2/1982 | Tazaki | 346/75 X |
| 4,330,787 | 5/1982 | Sato et al. | 346/140 PD |

*Primary Examiner*—A. D. Pellinen
*Assistant Examiner*—Derek Jennings
*Attorney, Agent, or Firm*—Fitzpatrick, Cella, Harper & Scinto

[57] ABSTRACT

An ink jet recording apparatus comprises an ink jet head section constructed with a plurality of pre-divided, discrete ink jet heads, a drive control section and a wiring section, and a common supporting member, on which these ink jet head section, drive control section, and wiring section are disposed and electrically connected each other.

13 Claims, 5 Drawing Figures

INK JET RECORDING APPARATUS

BACKGROUND OF THE INVENTION

1. Field of the Invention

This invention relates to an ink jet recording apparatus. More particularly, the invention is concerned with a recording apparatus provided with an ink jet head generally called "full line multi-array orifice type ink jet head".

2. Description of Prior Art

Among various recording systems which are known at present, the so-called "ink jet recording system" is regarded as highly useful in realizing various types of recording apparatus such as printer, word processor, reproduction device, etc., because it is of a non-impact recording system which produces the least noise at the time of recording, and is capable of recording at a high speed on a plain paper without necessity for any fixing treatment to be effected thereon. So far, various proposals have been made on this ink jet recording system, some of which are already commercialized after having many improvements made to them, and others are still being developed for practical uses.

The ink jet recording system is to perform image recording by causing droplets of recording liquid (which will simply be referred to as "ink" throughout the specification) to fly, based on various operating principles, onto the surface of a recording material such as paper, etc. An ink droplet producing device (i.e., an ink jet device) for use in such an ink jet recording system consists generally of an ink jet head for forming the ink droplets and an ink feeding system for feeding ink to the head.

As a type of the ink jet head, there is one that is generally called "a single orifice type" or "a semi-multi-orifice type" head having one to ten, or so, of the ink discharging orifices. This type of head is relatively simple in its construction, easy to replace when the head is out of order or damaged, and not so expensive as the other recording systems. In addition, since the ink feeding system for this type of ink jet head has a lesser number of ink discharge orifices, hence less consumption of ink, it can be constructed relatively simply utilizing a simplified cartridge tank or a single ink feeding pipe.

However, when using a different type of the ink jet head (generally called "full line multi-array orifice type head") capable of printing a line on the recording paper almost instantaneously, the replacement of the head is not easy thereby to increasing the possibility of trouble, and damage to some part of the head. Moreover, from the economic aspect, the replacement of the entire head is limited. Besides, when using the full line multi-array orifice type head, it is necessary to maintain a constant space interval between the head and the surface of the recording paper over the full breadth thereof during the recording operation. In order to attain this objective, there, so far, has been required high mechanical precision and assembly precision as well as complicated accessory mechanisms and troublesome measures for preventing the head from ink contamination and protecting the head itself during stoppage of the recording apparatus. Furthermore, in order to drive the full line multi-array orifice type ink jet head, a large number of electrode lead wires, say 2,000 to 4,000, are required so that the overall structure of the device becomes complicated. To avoid such a complicated device, there is a way of driving the head in a time-divisional mode by assembling the lead wires in a matrix form. Even in this instance, however, it is indispensable to insert arrays of diodes and transistors between the head and the lead wires arranged in a matrix for the purpose of imparting the switching function and various other functions to the wiring. Such an expedient has also brought about inconvenience such that, due to reliability of these semiconductor elements, breakage of the wiring during operation, and so on, the entire head unit comprising the head, the wiring, and others should be replaced with a new one.

SUMMARY OF THE INVENTION

It is therefore an object of the present invention to provide a recording apparatus provided with a highly stable and reliable ink jet head, which apparatus eliminates all of the problems of conventional apparatus.

It is another object of the present invention to provide an ink jet recording apparatus provided with a multi-array orifice type ink jet head which is readily replaceable and simpler in its maintenance and repair.

According to the present invention, in one aspect thereof, there is provided an ink jet recording apparatus of the cassette type (which as used herein means "easily replaceable") comprising: a pre-divided, discrete ink jet head section; a drive control section and a wiring section for said ink jet head section; and a common supporting member, on which said ink jet head section, drive control section, and wiring section are disposed and electrically connected each other.

According to the present invention, in another aspect thereof, there is provided an ink jet recording apparatus comprising: ink jet heads; and a drive control section and a wiring section to be electrically connected to each of said heads through electrical lead wires for said heads, said connection between said lead wires and said drive control section being effected by press-contacting both members.

The foregoing objects and other objects of the present invention will become more apparent and understandable from the following detailed explanations thereof when read in conjunction with the accompanying drawings.

BRIEF DESCRIPTION OF THE DRAWINGS

FIGS. 3A and 3B are detailed explanatory diagrams of a press-down device, wherein FIG. 3A is a longitudinal cross-section of the device, and FIG. 3B is a top plane view thereof.

DETAILED DESCRIPTION OF PREFERRED EMBODIMENTS

In the following, the present invention will be explained in detail with reference to preferred embodiments thereof as shown in the accompanying drawings.

Figure 1:
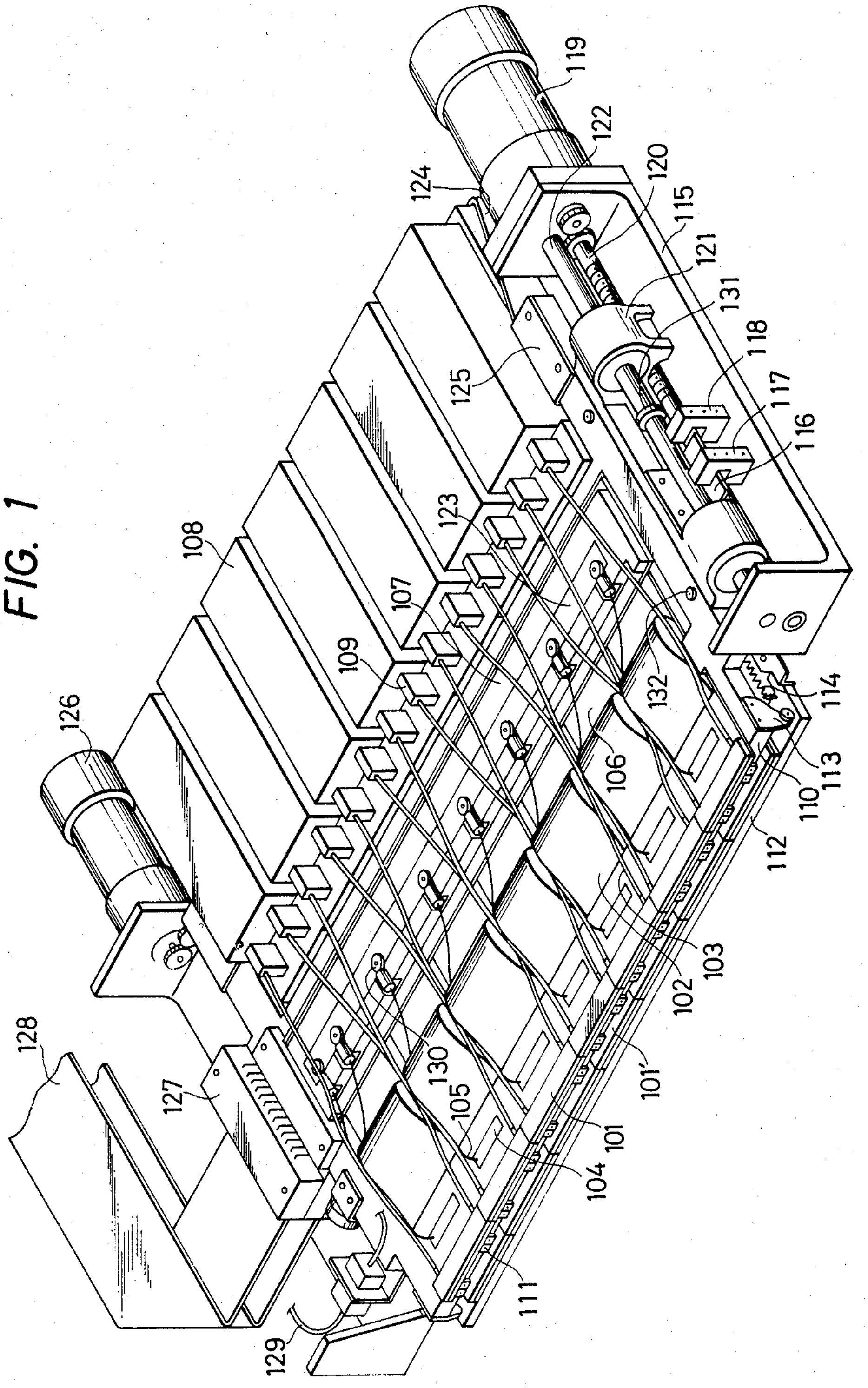
FIG. 1 is a perspective view showing an outer appearance of the ink jet recording apparatus according to the present invention.

Referring first to FIG. 1, numerals 101, 101' refer to upper and lower ink jet heads, respectively, of the multi-array orifice type. The ink jet head has a multitude of ink discharge orifices linearly arranged (on one line, for example) in the lateral end face thereof. Such rectilinear arrangement of the ink discharge orifices is disclosed in U.S. Pat. No. 4,243,994 (vide: FIG. 3 of the patent). A numeral 102 refers to a flexible printed plate to electrically connect the heads 101, 101' and a semiconductor installing base plate 106. A numeral 103 refers to a conduit pipe to feed ink to the heads 101, 101' from an ink tank (or reservoir) 108 through a connector 109. A reference numeral 104 designates a common pad to collect a plurality of lead wires which transmit electrical signals to the heads 101, 101'. The pad 104 is further connected to a signal output section (not shown) provided in the main body, where the ink jet recording apparatus as illustrated is mounted, through a lead wire 105, a lead terminal 130, a lead terminal fitting plate 123, and a drive circuit connecting line 129. The other lead wires necessary for driving the heads 101, 101' are connected to the printed plate 102, after which they are wired in matrix form on a multiplex wiring base plate 107 via the semiconductor installing base plate 106, and further connected to the signal output section (not shown) through a connector 127 and another drive circuit connecting line 128. A numeral 110 refers to a common base plate to mount thereon the ink jet heads 101, 101', the semiconductor installing base plate 106, the multiplex wiring base plate 107, and other elements associated with the heads. The common base plate 110 fixedly secures on both surfaces thereof the upper and lower heads 101, 101' with a plurality of fixing pawls 111 arranged on one lateral end face thereof. This common base plate 110 is also connected with an ink tank holding plate 124 at a connecting section 125. A reference numeral 112 designates a cap common to all of the ink jet heads 101, 101', and a numeral 113 refers to a contact pressure adjusting plate between the cap 112 and the heads 101, 101'. A numeral 114 refers to a spring. A reference numeral 115 designates a fixing block to set the ink jet recording apparatus of FIG. 1 on the main body (not shown). A motor 119 functions as power source for a driving screw rod 120 and a housing 121, and causes the head mounting base plate 110 connected to the housing 121 to reciprocate in the axial direction of the driving screw rod 120 as it rotates. A stop position of the reciprocating base plate 110 is determined by detecting a position of a reference plate 116 moving with the housing 121 through a backward stoppage sensor 117 and a forward stoppage sensor 118. Incidentally, a numeral 122 refers to a guide rail for the reciprocating movement of the housing 121 as mentioned above, and 131 a stopper for the housing. It should also be noted that the head mounting base plate 110 and the fixing block 115 are joined together with fixing screws 132. Further, another motor 126, which is not necessary for the present invention, functions as power source for oscillating the cap 112 contacted with the heads 101, 101'. Although FIG. 1 illustrates an embodiment, wherein a plurality of pre-divided, discrete ink jet heads 101, 101' are juxtaposed on both surfaces of the base plate 110, it is also feasible to use a single, elongated head having a group of full line multi-array orifices to extend over the span of the recording medium.

Figure 2:
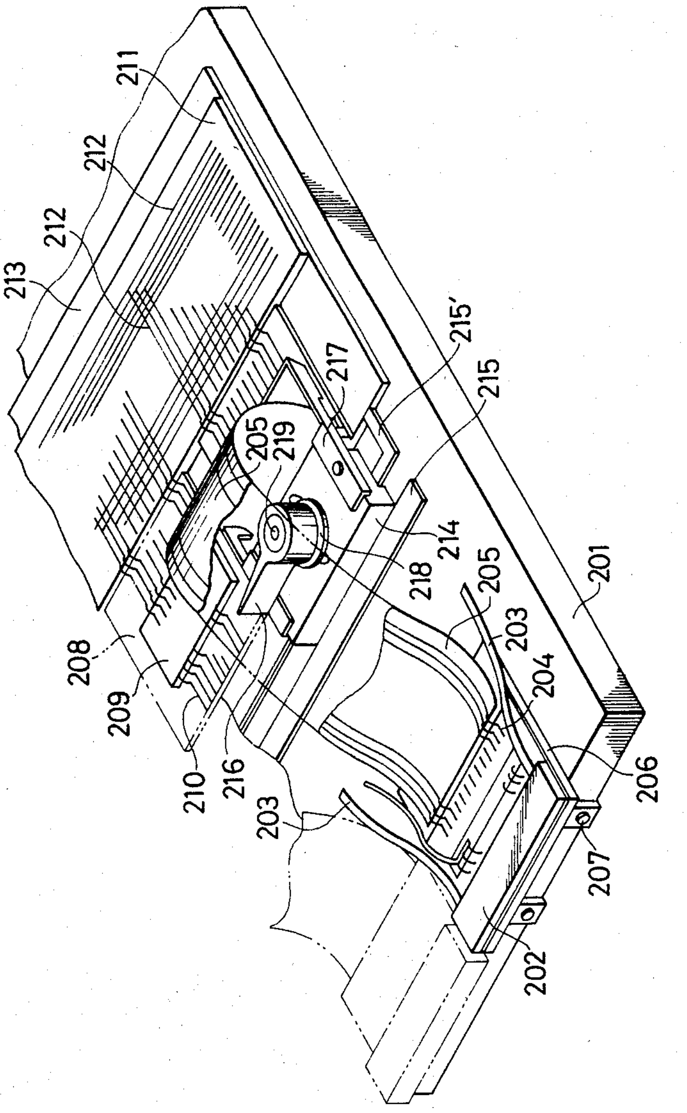
FIG. 2 is also a perspective view showing details of a main part of a unit of the ink jet head according to the present invention.

Referring to FIG. 2, there will be given, in the following, detailed explanations as to the construction of the principal part of the ink jet head unit.

The ink jet head unit according to the present invention is fundamentally constructed with a plurality of the pre-divided, discrete ink jet heads 202 of the multi-array orifice type. The semiconductor installing base plates 208, each having the drive control element 209 made of semiconductive elements, such as transistors and diodes, are fixed thereon with an electrically conductive adhesive agent, etc., in association with the head 202 and the multiplex wiring base plate 211. These members are removably fixed onto a supporting plate 201 so that a head unit of the cassette type is completed. Incidentally, a numeral 203 refers to an ink feeding tube for the head 202. Each head 202 is glued with adhesive agent, etc., to a head mounting plate 206 which, in turn, is accurately fixed at a predetermined position on the supporting plate 201 by means of fixing pawls 207, 207 provided on it. The head 202 has two sets of electrode wires for its driving, one set of which is omitted from the drawing. The other set as shown constitutes segment electrodes 204 which are bonded to the flexible printed plate 205. The abovementioned semiconductor installing base plate 208 and multiplex wiring base plate 211 have lead wires 210 and matrix wires 212, respectively, formed on their respective top surfaces by printing, or vapor deposition, or etching, or the like. The connection of the lead wires 210 and the matrix wires 212 may be done by bonding, which is preferable from the standpoint of reliability in the machine operation.

The abovementioned two base plates 208, 211 may be fixed directly on the supporting plate 201. Considering, however, facility in the bonding process, it is deemed advantageous to first fix both plates on a common supporting plate 213 thereby independently constructing the wiring section alone, and thereafter to further fix the common supporting plate 213 to the supporting plate 201. The lead wires 210 are bonded, at their one ends, to the drive control element 209. The other ends of the lead wires are press-contacted by a pressing member or jig 214 to one end of the flexible printed plate 205, which is not bonded to the ink jet head 202. The pressing member 214 is of such a construction that it electrically connects the lead wires 210 and the printed plate 205, and facilitates pitching between the lead wires 210 and the corresponding lead wires on the printed plate 205. The press-contact between the lead wires 210 and the printed plate 205 is made possible by urging a dish-shaped spring 218 with a screw 219. Difference in pitch between the abovementioned lead wires can be corrected by turning a handle lever 216 to cause the press-down jig 214 to move along sliding guides 215, 215'. In this instance, it is the role of a printed plate fixing frame 217 that fixes a relative position of the press-down jig 214 and the printed plate 205.

In the following, detailed explanations will be given in reference to FIGS. 3A and 3B as to the press-down jig 214. (FIG. 3A is a longitudinal cross-section showing the details of the press-down jig 214 (in FIG. 2), and FIG. 3B is a top plan view of the same.).

A handle 303, an off-center portion of which is hollow, fits with the press-down jig 302 through a window 311 formed in the jig. A packing member 308 is provided on one part of the press-down jig 302 to urge the flexible printed plate 307 onto the semiconductor installing base plate 306. In other words, the press-down jig 302 presses the packing 308 to the semiconductor installing base plate 306 fixed on the supporting plate 301 through the flexible printed plate 307. Incidentally, the sliding guides 304, 304' and a supporting shaft 305 for the jig 302 are also fixed on the supporting plate 301. The supporting shaft 305 with an internal screw thread being formed at the top part thereof is so designed that it may fit into a through-hole 303*a* of the handle 303. Further, a screw 309 is inserted into this through-hole 303*a* and screwed into the internal screw threads at the top part of the supporting shaft 305 to secure the handle to the press-down jig. A dish-shaped spring 310 is interposed between the lower surface of the handle 303 and the upper surface of the press-down jig 302. In operation, when the screw 309 is turned in the advancing direction, the handle 303 is pushed because the supporting shaft 305 is fixed to the supporting plate 301. Practically, however, the dish-shaped spring 310 receives the pressing force and transmits it to the press-down jig 302.

Figure 3A:
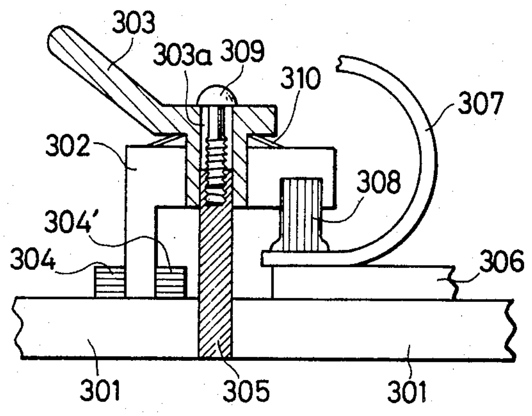
Figure 3B:
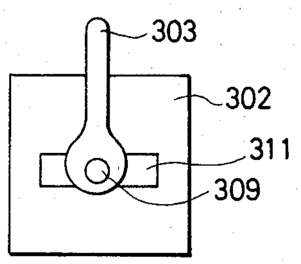

Next, as to a mechanism for lateral movement of the press-down jig 302 (i.e., in the direction normal to the surface of the drawing sheet of FIG. 3A), it is constructed in such a manner that the handle 303 and the supporting shaft 305 are fitted eccentrically. On account of this, stress occurs to the handle 303 when it is turned, and the press-down jig 302 moves along the sliding guides 304, 304' under the force from the stress, while it is being held between them. In this case, no smooth movement of the press-down jig 302 can be secured, unless the screw 309 is loosened to some degree.

Figure 4:
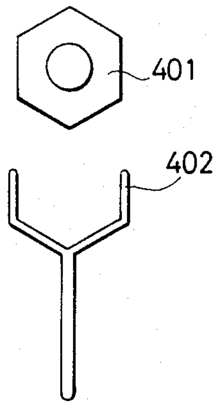
FIG. 4 is a schematic diagram showing another embodiment of the press-down device according to the present invention.

FIG. 4 shows another embodiment of the handle, wherein a fixing metal member 401 is deprived of a hand-piece from the handle 303 of FIGS. 3A(and 3B). This simplifies the structure of the press-down jig, and the overall construction of the apparatus becomes less complicated. A numeral 402 in FIG. 4 refers to a turning jig for the fixing metal member 401.

As has been explained so far, the ink jet recording apparatus of the present invention is so constructed that the multi-array orifice type ink jet head constituting the head unit, the drive control section for the head, and the wiring section for the drive control section, all being fabricated individually beforehand, are arranged on the common supporting plate in a readily replaceable manner. It is therefore possible that, in assembling the head unit, the multi-array orifice type ink jet heads and the semiconductor elements are specifically selected, and the assemblage is effected with only those having excellent capability, hence reliability of the recording apparatus increases. Further, as stated above, even when a part of the recording apparatus needs to be replaced due to damage, etc., caused thereto, it is sufficient to replace the relevant part, which enables the maintenance and repair work to the recording apparatus to be effected highly efficiently and economically.

What we claim is:

1. Ink jet recording apparatus comprising:

a head unit of the cassette type comprising a plurality of ink jet head sections of which each comprises a multi-array orifice ink jet head for effecting recording at a predetermined position and a drive control element for driving the associated ink jet head to project a liquid droplet on demand from at least one orifice thereof;

common multiplex wiring means for supplying electric signals to each of said drive control elements;

a reservoir for storing liquid to be fed to said head unit of the cassette type; and a common supporting member supporting said head unit of the cassette type, said common multiplex wiring means and said reservoir, each of said ink jet heads and each of said drive control element being removably fixed on said common supporting member in such a manner as to be removable therefrom independently of the other said ink jet heads and drive control elements.

2. The ink jet recording apparatus as set forth in claim 1, wherein said ink jet head section, drive control section, and wiring section are detachably mounted onto said common supporting member.

3. The ink jet recording apparatus as set forth in claim 1, wherein said ink jet head section has a plurality of ink discharging orifices in a predetermined arrangement.

4. The ink jet recording apparatus as set forth in claim 1, wherein said head unit of the cassette type comprises electrode leads which are connected to said drive control elements.

5. The ink jet recording apparatus as set forth in claim 1, wherein said head unit of the cassette type and wiring section are connected in series.

6. The ink jet recording apparatus as set forth in claim 4, wherein a part of said electrode leads consists of a flexible printed plate.

7. Ink jet recording apparatus which comprises:

a head unit of the cassette type comprising a plurality of ink jet head units each of which comprises a multi-array orifice ink jet head for effecting recording at a predetermined position and a drive control element for driving said ink jet head to project a liquid droplet on demand from at least one orifice thereof;

common multiplex wiring means for supplying electric signals to each drive control element; and electrode leads through which said wiring means is electrically connected to said head unit, wherein said electrode leads and corresponding ones of said drive control elements are connected by means of pressure contact.

8. The ink jet recording apparatus as set forth in claim 7, wherein said head unit of the cassette type includes said electrode leads and at least a part of said electrode leads comprise a flexible printed plate.

9. The ink jet recording apparatus as set forth in claim 1, further comprising a common supporting member, and wherein said head unit of the cassette type and said wiring means are arranged on said common supporting member.

10. The ink jet recording apparatus as set forth in claim 7, wherein said electrode leads and drive control elements engage each other in a freely attachable and detachable manner.

11. The ink jet recording apparatus as set forth in claim 7, wherein said drive control elements and wiring means are connected by bonding.

12. The ink jet recording apparatus as set forth in claim 7, wherein said ink jet head has a plurality of ink discharge orifices in a predetermined arrangement.

13. The ink jet recording apparatus as set forth in claim 7, wherein said head unit of the cassette type and said wiring means are connected in series.

* * * * *

UNITED STATES PATENT AND TRADEMARK OFFICE

CERTIFICATE OF CORRECTION

PATENT NO. : 4,499,478

DATED : February 12, 1985

INVENTOR(S) : YOHJI MATSUFUJI, ET AL.

It is certified that error appears in the above-identified patent and that said Letters Patent is hereby corrected as shown below:

Col. 1, line 50, delete "to".

Col. 6, line 45, change "1" to --7--.

Signed and Sealed this

*Fourth* Day of *February 1986*

[SEAL]

*Attest:*

DONALD J. QUIGG

*Attesting Officer*

*Commissioner of Patents and Trademarks*